United States Patent
Burritt et al.

(10) Patent No.: US 7,307,982 B2
(45) Date of Patent: Dec. 11, 2007

(54) APPARATUS AND METHOD FOR CONTROLLING TELEPHONY ENDPOINTS

(75) Inventors: David Ray Burritt, Broomfield, CO (US); Matthew Jerome Stevens, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1038 days.

(21) Appl. No.: 10/371,639

(22) Filed: Feb. 21, 2003

(65) Prior Publication Data
US 2004/0165578 A1    Aug. 26, 2004

(51) Int. Cl.
*H04L 12/66* (2006.01)
(52) U.S. Cl. ............ 370/352; 370/353; 370/354; 370/355; 370/356
(58) Field of Classification Search ......... 370/352–356
See application file for complete search history.

(56) References Cited

U.S. PATENT DOCUMENTS

| | | | |
|---|---|---|---|
| 4,748,656 A | 5/1988 | Gibbs | |
| 5,548,729 A | 8/1996 | Akiyoski | |
| 6,421,425 B1 | 7/2002 | Bossi et al. | |
| 6,950,501 B1 | 9/2005 | Chaturvedi et al. | |
| 6,987,756 B1 * | 1/2006 | Ravindranath et al. | 370/352 |
| 2002/0057765 A1 | 5/2002 | Hyziak et al. | |
| 2003/0056003 A1 | 3/2003 | Nakatani | |
| 2005/0094776 A1 | 5/2005 | Halderman et al. | |
| 2006/0094775 A1 | 5/2006 | Smith et al. | |

* cited by examiner

*Primary Examiner*—Quynh H. Nguyen
(74) *Attorney, Agent, or Firm*—John C. Moran

(57) ABSTRACT

An apparatus and method that uses a computer interposed between the telephony endpoint and the telecommunication system controlling that telephony end point.

72 Claims, 10 Drawing Sheets

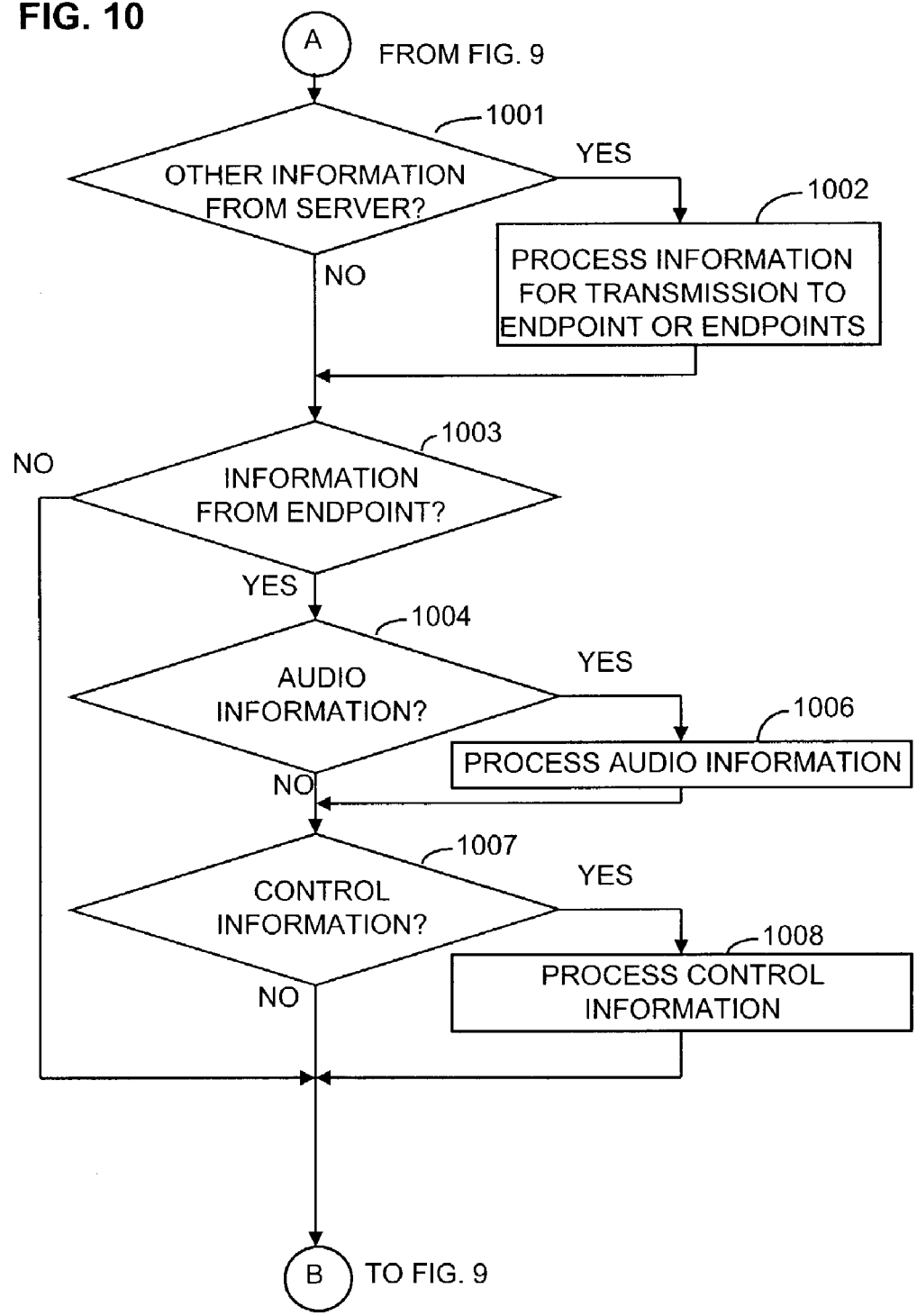

APPARATUS AND METHOD FOR CONTROLLING TELEPHONY ENDPOINTS

TECHNICAL FIELD

This invention relates to telecommunication switching systems, and in particular, to the control and monitoring of telephony endpoints.

BACKGROUND OF THE INVENTION

Within the prior art, it is known to provide many types of features for telephony endpoints such as telephone sets. This is true of IP telephone sets (also referred to as IP hard phones). Such features are provided by the programming or re-programming of the computers that control the telecommunication switching system providing the service for the IP telephone. Even though such software systems are often touted as being flexible and easily adapted, in general, this is only true for small software programs and those controlling non-real time events. For large software systems controlling real time processes, such as telecommunication switching processes, these systems are not particularly flexible. The reason for this inflexibility is that the software systems are quite large, each portion of the system is time critical, and reliability is of the utmost importance. It is common place for software that runs on a personal computer to use a message when necessary for the user to reboot the system or for the system to automatically reboot itself. However, in real time systems, such as telecommunication systems, the software must run unattended and maintain reliability through a variety of conditions. The processes that are gone through to assure this reliability and speed of telecommunication software systems makes these systems expensive to develop and very prone to fatal errors if small changes are made within the software. In addition, such software systems are developed over many years, beginning with a common base which advances with further development. It is not uncommon that the developers of the software systems are no longer employed or working on these systems. Consequently, the people that would be making the modifications are not aware of all of the considerations that were used to cause certain sections of the program to be written in a certain way. Further, telecommunication software systems are controlling a large number of telephony endpoints and if the software system fails, then a large number of users would not be provided telecommunication service. In addition, whereas it may be possible for the manufacturers of a particular telecommunication system to reprogram the software systems, it may not be advantageous for the manufacturer to do so if the new feature would only be utilized by a small percentage of the manufacturer's potential customers. On the other hand, if it was possible for a third party software developer to develop the program, it might be quite economical for the third party developer to develop such software. This assumes of course that the third party software developer has lower development costs. In addition, if the program developed by the third party software developer would only effect one or a small set of telephones then the requirements for reliability of the software system are not as great.

SUMMARY OF THE INVENTION

The aforementioned problems are solved and a technical advance is achieved in the art by an apparatus and method that uses a computer interposed between the telephony endpoint and the telecommunication system controlling that telephony end point.

BRIEF DESCRIPTION OF THE DRAWING

FIGS. 9 and 10 illustrate, in flowchart form, operations performed by an embodiment of a server.

DETAILED DESCRIPTION

Figure 1:
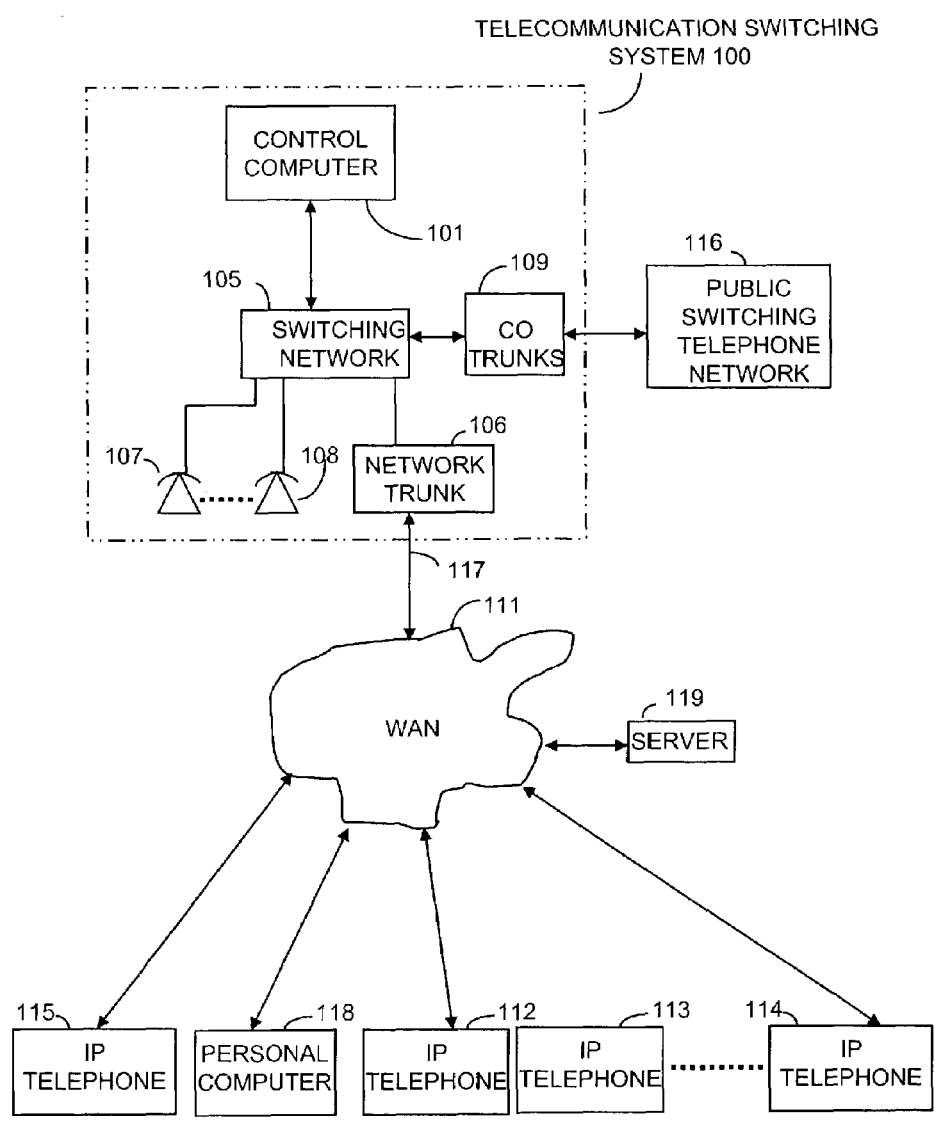
FIG. 1 illustrates, in block diagram form, an embodiment of the invention.

FIG. 1 illustrates an embodiment for implementing the invention. In FIG. 1, control computer 101 performs the overall control functions for conventional telephones 107-108 and IP telephone sets 112-114. IP telephone sets 112-114 may be IP telephone set 4624 manufactured by Avaya Inc., or a similar telephone set. Switching network 105 performs the switching of not only audio information but also control information to and from computer 101 to the telephone sets. Computer 101 is interconnected to wide area network (WAN) 111 via network trunk 106. Control computer 101 controls telephones 107-108 by transmission of call status and reception of control information plus the communication of audio information via switching network 105. Telephone sets 107-108 can be analog telephone sets, ISDN telephone sets or proprietary digital protocol telephone sets.

IP telephones 113-114 communicate control and audio information with telecommunication switching system 100 in a conventional manner. The manner in which IP telephones 113-114 communicate information with telephone communication switching system 100 for a similar system is disclosed in U.S. patent application Ser. No. 09/18,909, entitled "Integration of Remote Access and Service", filed Nov. 22, 2000 and assigned to the same assignee as the present application. U.S. patent application Ser. No. 09/18,909 is hereby incorporated by reference. In accordance with one embodiment of the invention, IP telephone 112 communicates control and audio information with telecommunication switching system 100 in a different manner. Personal computer 118 is associated with IP telephone 112. In one embodiment, IP telephone 112 and personal computer 118 share a common physical location such as a user's desk. In this embodiment of the invention, personal computer 118 establishes communication with telecommunication switching system 100 utilizing techniques described in the incorporated U.S. patent application via WAN 111. IP telephone 112 establishes communication with personal computer 118 via WAN 111. In one embodiment, the establishment of communication by IP telephone 112 causes personal computer 118 to establish communication with telecommunication switching system 100. Personal computer 118 establishes communication with telecommunication switching system 100 as if personal computer 118 was an IP telephone such as IP telephone 112. Indeed, personal computer 118 establishes communication with telecommunication switching system 100 as if it was IP telephone 112. The result is that all control and audio information flows first to personal computer 118 before personal computer communicates this information to IP telephone 112. In one embodiment, personal computer 118 implements an IP soft telephone. This allows the user of IP telephone 112 to either place and receive calls using either the soft IP telephone being implemented by personal computer 118 or by utilizing IP telephone 112. Also, in one embodiment, personal computer 118 can be receiving textual or audio information from server 119 via WAN 111 and can display the textual information on the display of IP telephone 112 or can interject the audio information into the conversation in which the user of IP telephone 112 is engaged. Such information could be stock information, weather information, or immediate alerts, etc.

In addition, personal computer 118 can be utilized to provide audio information defining visual call status information for the visually impaired user of IP telephone 112. Personal computer 118 performs this function by first receiving the call status information from telecommunication switching system 100 and then converts the call status information to audio information that is presented to the user of IP telephone 112 either via the speaker phone or the receiver of the handset of IP telephone 112. Personal computer 118 simply inserts the audio call status information into the audio information that is being transmitted to IP telephone 112 via personal computer 118 from telecommunication switching system 100.

In another embodiment, both IP telephone 112 and IP telephone 115 establish communication with personal computer 118 via WAN 111. Personal computer 118 logs into telecommunication switching system 100 as IP telephone 112 and IP telephone 115. Hence, this embodiment allows personal computer 118 to implement an IP soft telephone and to allow the user to utilize either IP telephone 115 and IP telephone 112 to carry on conversations, the user can utilized the display of the IP soft phone being implemented on personal computer 118 to maintain an indication of the status of these two calls. In certain industries, namely individuals who deal in mergers and acquisition negotiations, the capability of being able to talk on either one or another line without having to perform any switching is of a highly desirable ability. Since all control and audio information is communicated via personal computer 118, this embodiment can be implemented solely on software written for personal computer 118.

Figure 2:
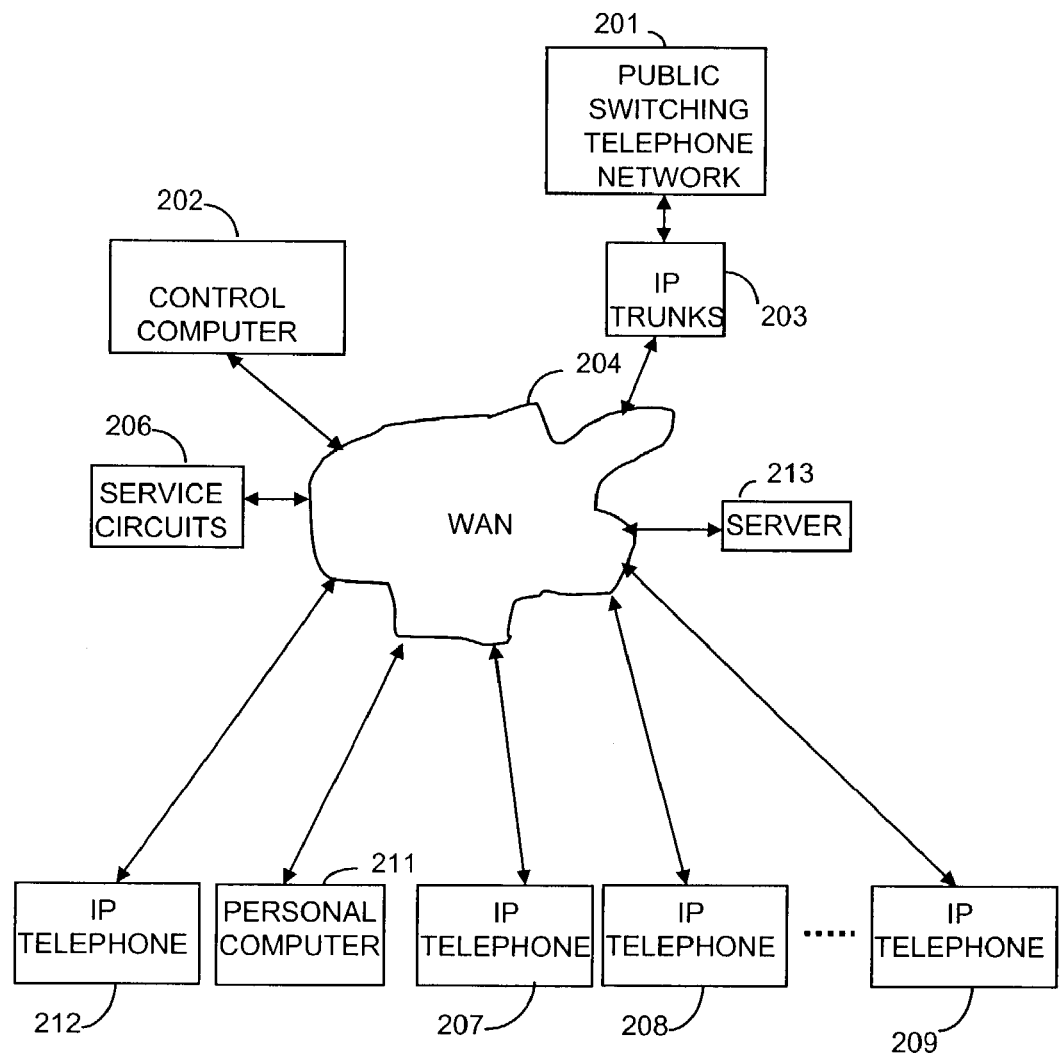
FIG. 2 illustrates, in block diagram form, another embodiment of the invention.

FIG. 2 illustrates another embodiment for implementing the invention. Control computer 202 is controlling the operations of IP telephone sets 208-209 and controlling the operations of IP telephones 207 and 212 via personal computer 211 with respect to telecommunication operations by the communication of control and audio information via WAN 204. Service circuits 206 under control of control computer 202 provide tone generation, conferencing, etc. via WAN 204 to IP telephone sets 207-209 and 212. For a telecommunication call which is only between two telephone sets such as IP telephones 208-209, the IP telephone sets communicate via WAN 204 for the transmission of audio information. Public switching network 201 is interconnected to WAN 204 via IP trunk 203. Personal computer 209 and server 213 perform similar functions to those performed in the various embodiments with respect to personal computer 118 and server 119 of FIG. 1.

Personal computer 211 establishes communication with control computer 202 utilizing the identification information of IP telephone 207 via WAN 204. IP telephone 207 establishes a communication link to personal computer 211 via WAN 204. Personal computer 211 is interposed between all control information communicated between IP telephone 207 and control computer 202. In addition, personal computer 211 is interposed between IP telephone 207 and all audio information being communicated with or from WAN 204.

One skilled in the art could readily envision that personal computer 211 could perform all of the embodiments previously described with respect to personal computer 118.

Figure 3:
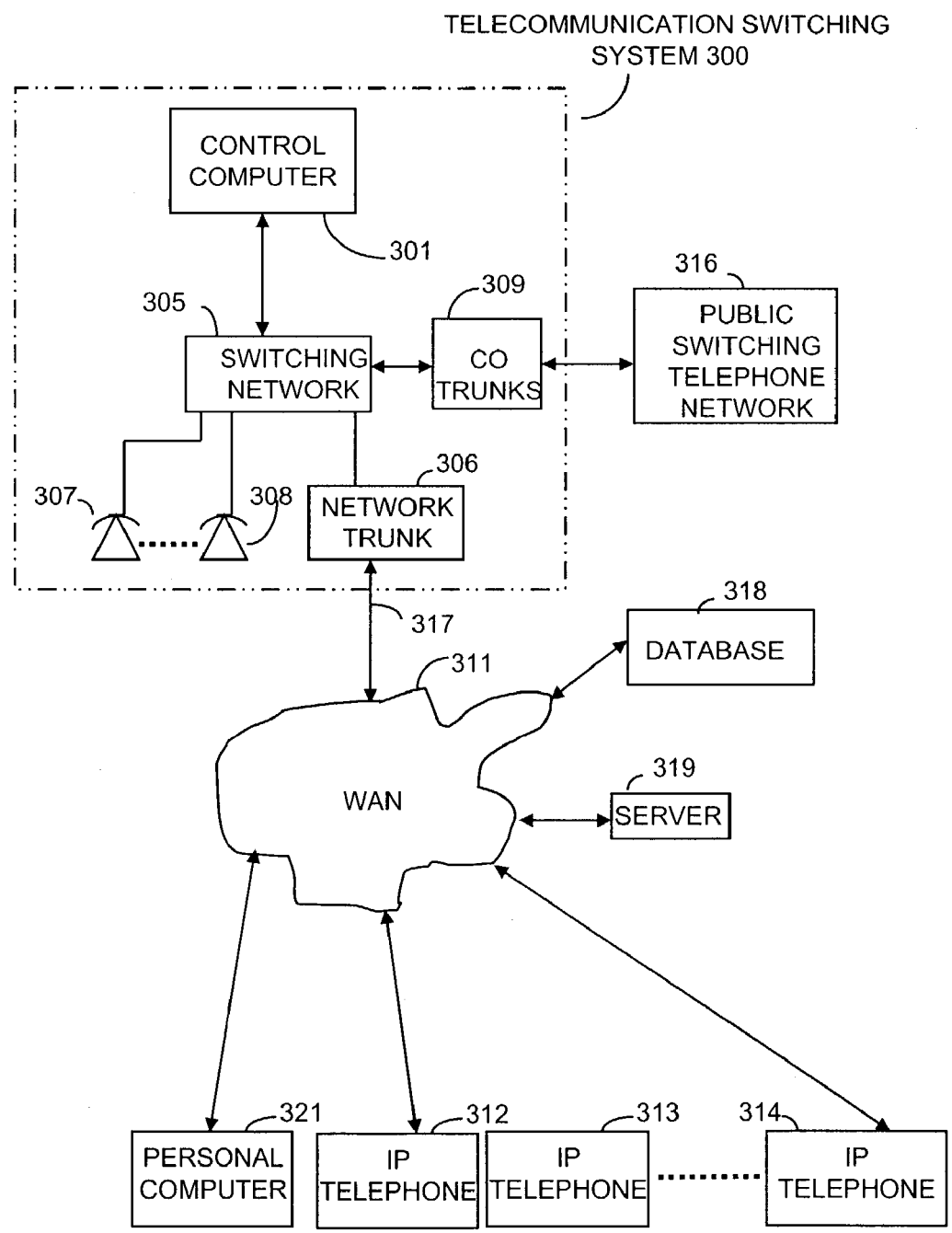
FIG. 3 illustrates, in block diagram form, another embodiment of the invention.

FIG. 3 illustrates, in block diagram form, another embodiment of the invention. In the embodiment illustrated in FIG. 3, server 319 logs into telecommunication switching system 300 as IP telephones 312-314. IP telephones 312-314 then establish communication with server 319 for performing the telecommunication operations. Personal computer 321 also establishes communication with server 319. Elements 301, 305, 306, 307, 308, and 309 perform the same functions as like entities on FIG. 1. Since server 319 controls all communication between telecommunication switching system 300 and IP telephones 312-314, it is possible to create a large number of new telecommunication operations by software being implemented on server 319. In one embodiment, server 319 provides a feature which is referred to in the prior art as "hoot and holler" which is commonly used and desired by the financial industry. The "hoot and holler" feature allows hundreds of traders to listen in and participate on a call. Another embodiment of FIG. 3 would be utilized in an automatic call distribution system where server 319 would provide the enhanced automatic call distribution features utilizing information from database 318. In such an embodiment, personal computers, such as personal computer 321, could be associated with each IP telephone 312-314. The advantage of utilizing server 319 to provide the enhanced telecommunication features is that a third party vendor can write such software and if the software running in server 319 was to fail, the IP telephones could simply log into telecommunication switching system 300 and utilize the standard telecommunication features. This redundancy allows various software to be written for server 319 without an over concern for the reliability of that software during its initial development and use. Server 319 could also provide the various functions that were previously described for the personal computer in FIGS. 1 and 2.

Figure 4:
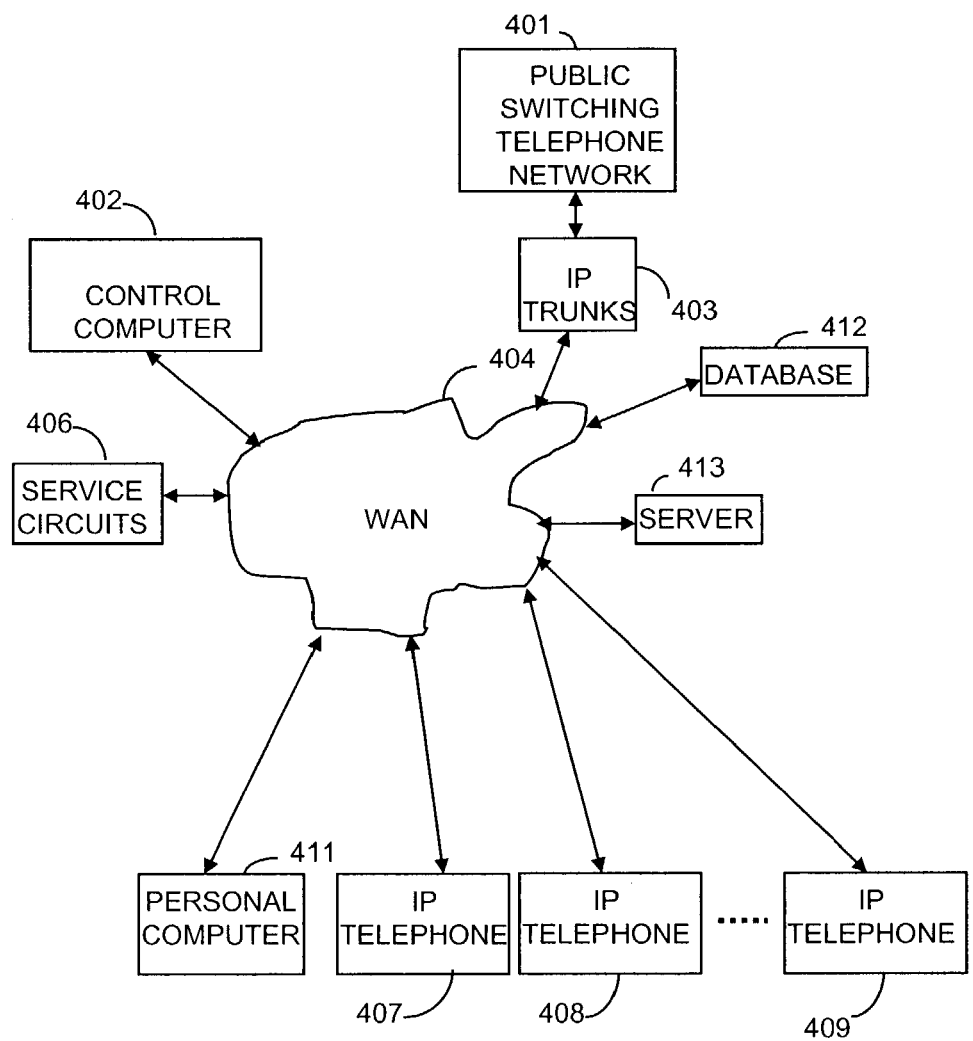
FIG. 4 illustrates, in block diagram form, another embodiment of the invention.

FIG. 4 illustrates another embodiment of the invention. Elements 401-406 perform the same operations as elements 201-206 of FIG. 2. Elements 407-412 perform similar operations to those performed by elements 312-321 of FIG. 3.

Figure 5:
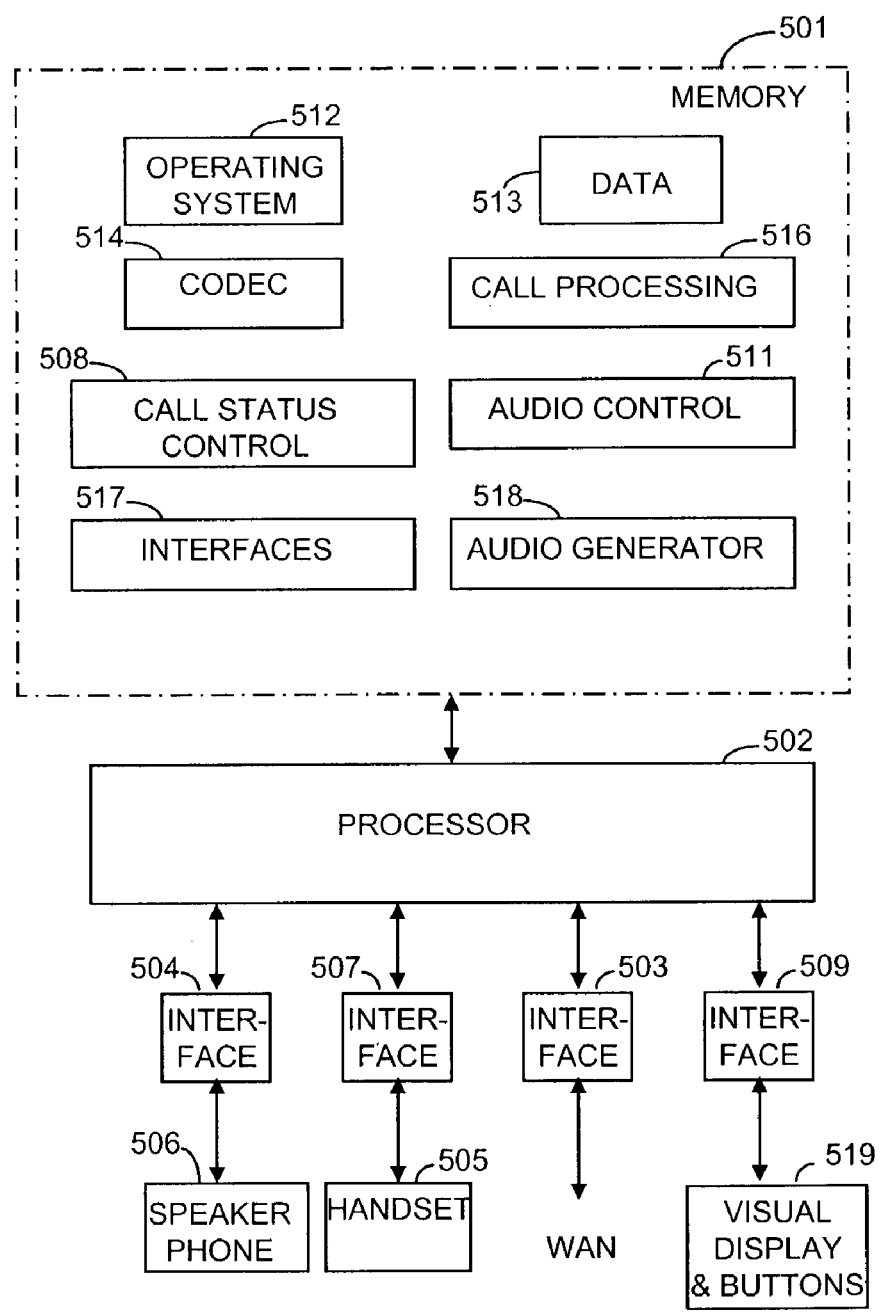
FIG. 5 illustrates, in block diagram form, an embodiment of an IP telephone set.

FIG. 5 illustrates, in block diagram form, one embodiment of an IP telephone such as IP telephone set 112. Processor 502 provides the overall control for the functions of IP telephone set 112 by executing programs and storing and retrieving data from memory 501. Processor 502 connects to WAN 111 or 204 via interface 503. Processor 502 interfaces to handset 302 via interface 507 and connects to visual display and buttons 519 via interface 509. Processor 502 performs the operations of IP telephone set 112 by executing the routines illustrated in memory 501.

Operating system 512 provides the overall control and the necessary protocol operations. Operating system routine 512 provides all control functions required to implement the TCP/IP protocol as is well known to those skilled in the art.

Data is stored in data block 513. CODEC 514 encodes and decodes the audio information for communication with handset 505 or conference speaker and microphone 506 for communication with WAN 111 or 204. Overall control of the call processing is performed by the IP telephone set 112 under the control of call processing routine 516. The communication and control of the various interfaces illustrated in FIG. 5 is provided by interfaces routine 517. Audio generator routine 514 implements other software methods for reproducing sounds.

Call status control routine 508 receives information from call processing routine 516 concerning control information received via WAN 111 or 204 to update indicators or display of visual display and buttons 519. Similarly, call status control 508 receives actuation information for buttons or the keypad of block 519 from call processing routine 516.

The speaker of unit 506 or the receiver of handset 505 can be utilized for this reproduction of the audio call status information. Audio control 511 can utilize CODEC routine 514 to reproduce this audio call status information or audio generator routine 518. The audio information is transferred via the appropriate handset to either the speaker or receiver.

Figure 6:
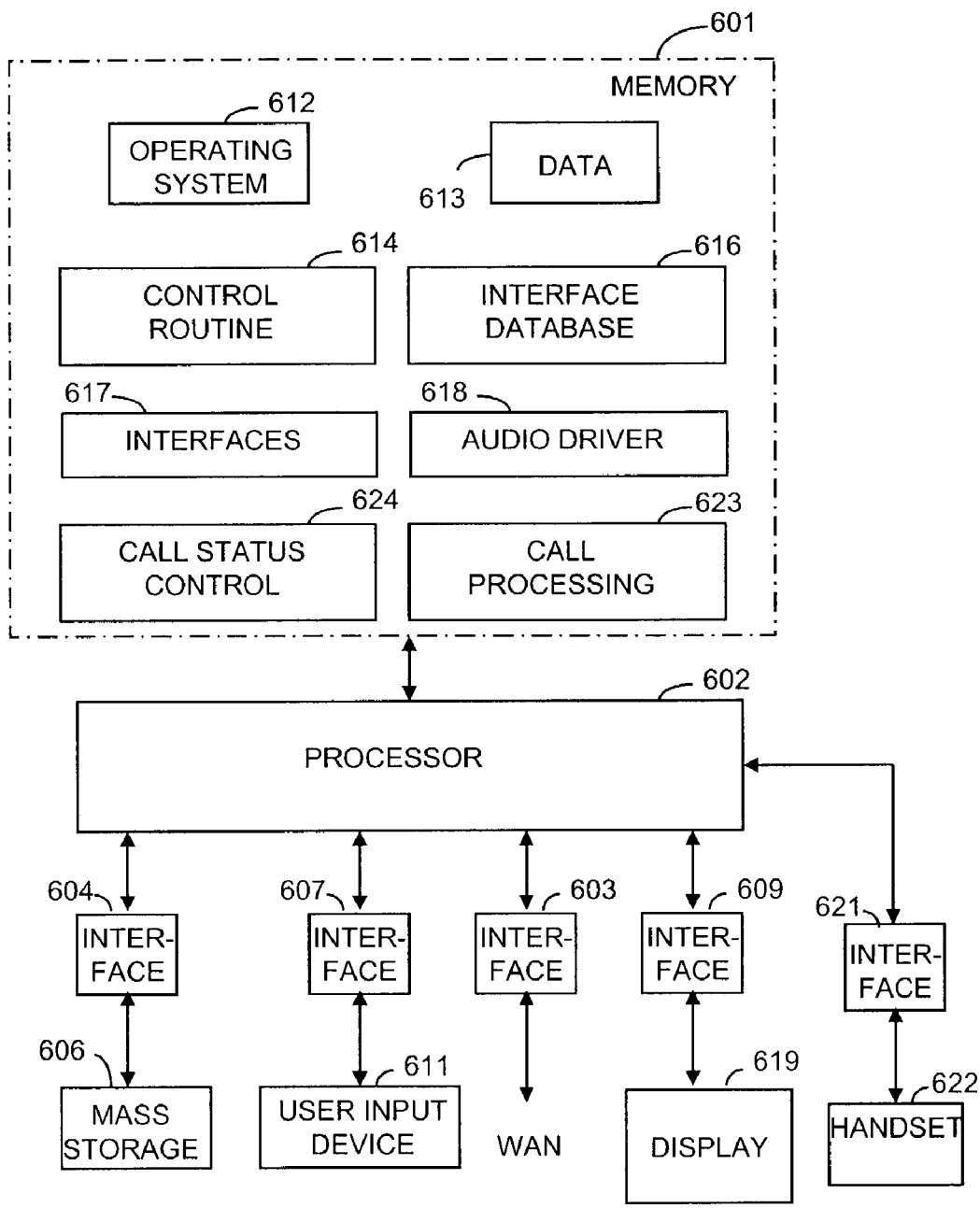
FIG. 6 illustrates, in block diagram form, an embodiment of a personal computer.

FIG. 6 illustrates, in block diagram form, one embodiment of a computer such as computer 118 or 211. Processor 602 provides the overall control for the functions of a computer by executing programs and storing and retrieving data from memory 601. Processor 602 connects to WAN 111 or 204 via interface 603. Processor 602 interfaces to user input device 611 via interface 607 and connects to display 619 via interface 609. Processor 602 performs the operations of a computer by executing the routines illustrated in memory 601. Interface 621 and handset 622 allow the implementation of a soft IP phone.

Operating system 612 provides the overall control and the necessary protocol operations. Operating system routine 612 provides all control functions required to implement the TCP/IP protocol as is well known to those skilled in the art. Data is stored in data block 613. Interface database 616 stores preferences and options that define the user interface. Overall control is performed by control routine 616. The communication and control of the various interfaces illustrated in FIG. 6 is provided by interfaces routine 617. Audio driver 618 controls the reproduction of sounds. Call processing routine 623 and call status control routine 624 provide control for the telephony operations.

After being started in block 700, a computer such as computer 118 or 211 of FIGS. 1 and 2, respectively, will connect as an IP endpoint to the gatekeeper for the telecommunications services. A variety of IP endpoints may receive telephony service from computers 118 or 211. These IP endpoints include IP telephones, wireless telephones, personal digital assistants (PDAs), etc. In FIG. 1, the gatekeeper is telecommunication switching system 100; whereas, in FIG. 2, the gatekeeper is control computer 202. Next, decision block 702 determines whether a connection is to be made to a server such as server 119 of FIG. 1. In one embodiment, a connection to a server will be made if the computer is to receive textual or audio information from the server for presentation to the user of an IP endpoint. This information may be received in textual form and displayed on the IP endpoint or can be received in textual form and interjected as audio information to the user during a telephone conversation. Such information can be stock information, weather information, or immediate alerts, etc. If the answer is yes in decision block 702, control is transferred to block 703 which makes the connection to the server via WAN 111 or WAN 204. Control is transferred from decision block 702 or block 703 to decision block 704.

Decision block 704 determines if a first IP endpoint is trying to connect into the computer. For example, this could be IP endpoint 112 of FIG. 1. The IP endpoint makes the connection to the computer via the WAN by transmitting the telephone number along with a password to the computer. If an IP endpoint is connecting, control is transferred to block 706 which establishes the connection via the WAN. Control is transferred from decision block 704 or block 706 to decision block 707 which in conjunction with block 708 determines whether a second IP endpoint is attempting to connect to the computer. One skilled in the art would readily realize that the computer could be capable of allowing more than two IP endpoints to be connected. After execution of either decision block 708 or block 708 to decision block 709 which determines if a soft IP telephone that is being implemented on the computer itself utilizing the handset, etc. illustrated in FIG. 6 is trying to establish a connection. Note, that this connection will not be made through the WAN in general, although one skilled in the art could see how that could also be accomplished. If the answer is yes in decision block 709, block 711 establishes the operations of the soft IP telephone before transferring control to decision block 712.

Figure 8:
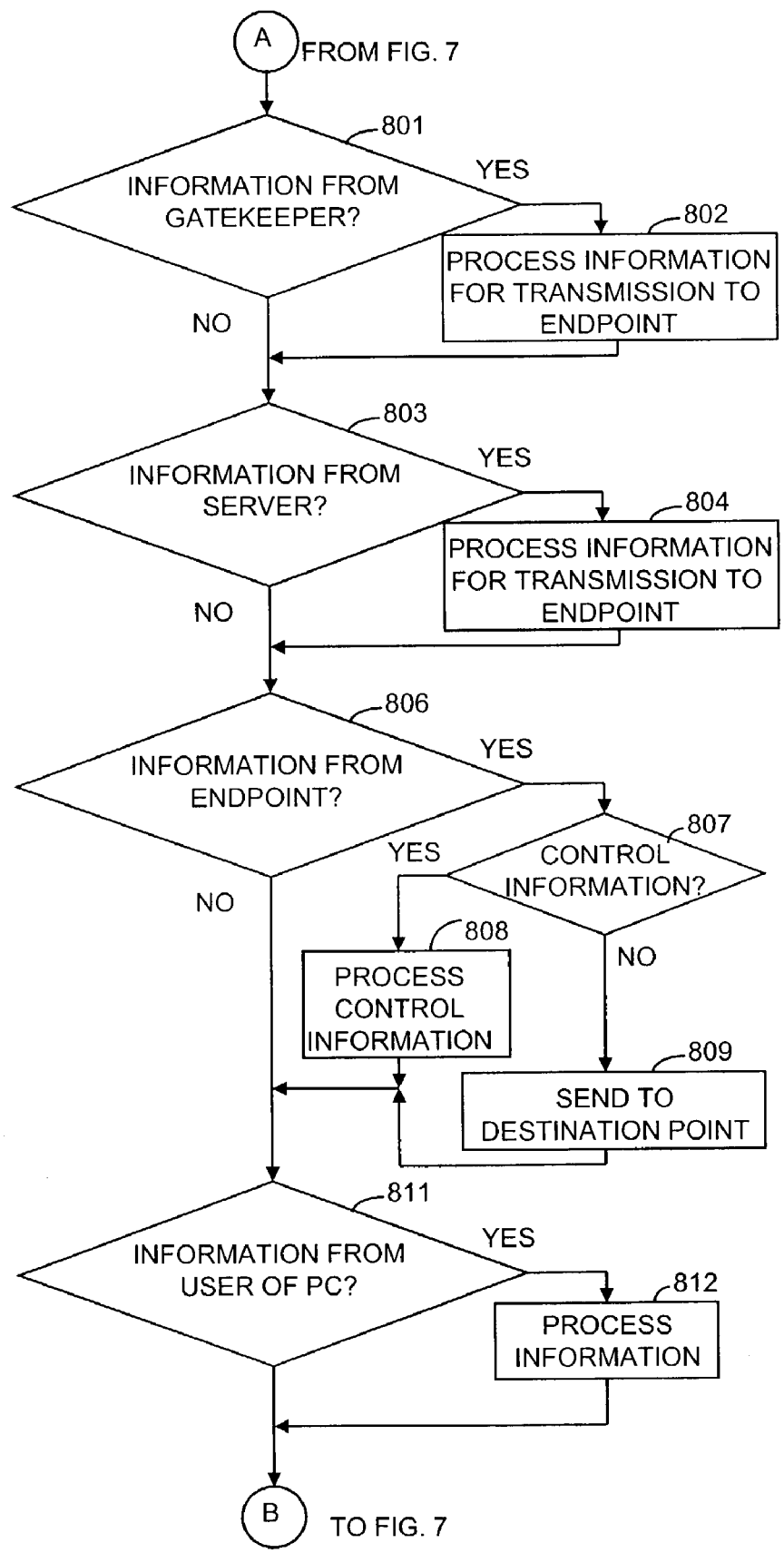

Decision block 712 determines if any of the IP endpoints have disconnected. If the answer is yes, block 713 performs the necessary operations to disconnect the IP endpoint. In addition, block 713 determines if there are any remaining IP endpoints on the connection. After execution of either decision block 712 or block 713, control is transferred to decision block 801 of FIG. 8.

Decision block 801 determines if information is being received from the gatekeeper. If the answer is yes, control is transferred to block 802. Block 802 processes the information if required before transmission to the IP endpoint. In some embodiments, certain types of information, for example audio information, may not be processed before being transmitted to the IP endpoint. Other information, such as control information or status information, may be processed and indeed in certain applications changed from visual display information to audio information so that the IP endpoint can present the audio information rather than visual information to the user of the IP endpoint. In addition, the computer may display control information on the display of the computer (e.g., display 619 of FIG. 6) so that the user can receive visual information in addition to what is being presented on the IP endpoint itself. One skilled in the art could immediately envision different embodiments of displaying control or status information received from the gatekeeper on the display of the computer, in particular where two IP telephones were active on the computer. After execution of either decision block 801 or block 802, control is transferred to decision block 803.

Decision block 803 determines if information is being received from the server that is to be transmitted to the IP endpoint. As previously noted, in some embodiments, the server may be transferring information to the computer for display on the IP endpoint such as stock information, weather information, or immediate alerts, etc. The server may be programmed to provide a variety of audio and visual information to the user of the IP endpoint connected to the computer. Audio information could be transmitted to the user while the user was engaged in a telephone conversation in a manner such that only the user of the IP endpoint would receive the audio information. The server may send digital information that may be converted by the computer into the proper audio format for utilization by the IP endpoint. After execution of either decision block 803 or block 804, control is transferred to decision block 806.

Decision block 806 determines if there is information being received from the IP endpoint. If the answer is yes, decision block 807 determines if it is control information being received or audio information. If control information is being received, decision block 807 transfers control to block 808 which processes the control information. The control information may be utilized and reacted to by only the computer, may be modified and retransmitted to the gatekeeper, or modified and retransmitted to the server. In addition, the computer, gatekeeper, and server or some combination thereof may each receive a portion of the control information for processing. In one embodiment, this capability allows the actuation of a single button on an IP telephone to result in the gatekeeper and the server performing different functions to accomplish different results. After execution of block 808, control is transferred to decision block 811.

Returning to decision block 807, if the answer is no, the audio information is transmitted to the destination point. However, in one embodiment, the server maintains a recording of the conversation, and the audio information is transmitted to the destination point and to the server. In addition, the server may be doing a voice-to-text function so that a transcription is being maintained of the telephone conversation as well. If this is the situation, block 802 would also transmit audio information to the server. After execution of block 809, control is transferred to decision block 811.

Figure 7:
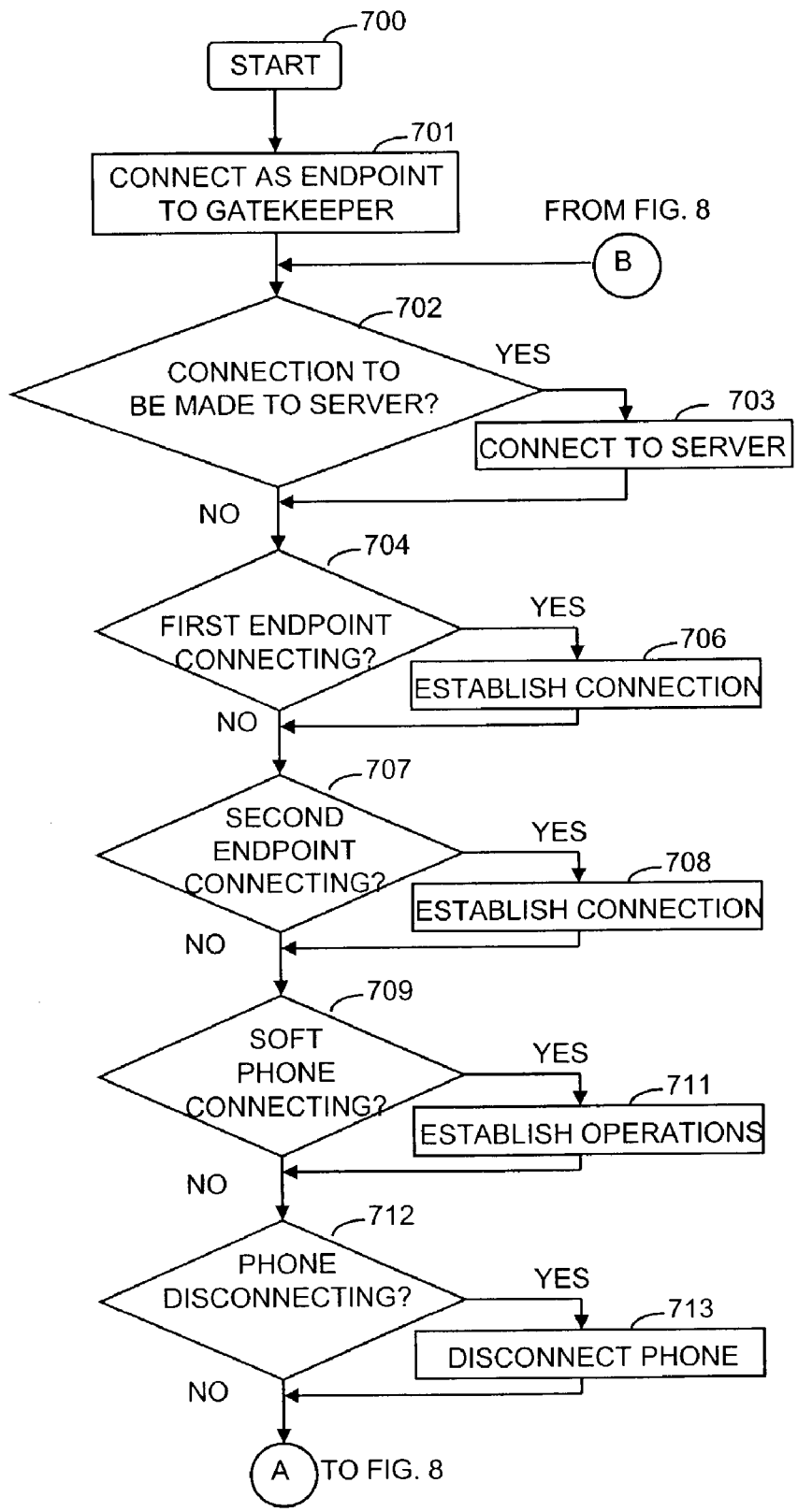
FIGS. 7 and 8 illustrate, in flowchart form, operations performed by an embodiment of a personal computer.

Decision block 811 determines if there is information being entered into the computer by the user. If the answer is yes, control is transferred to block 812 for the processing of this information. After execution of block 812 or a no response in decision block 811, control is transferred back to decision block 702 of FIG. 7.

Figure 9:
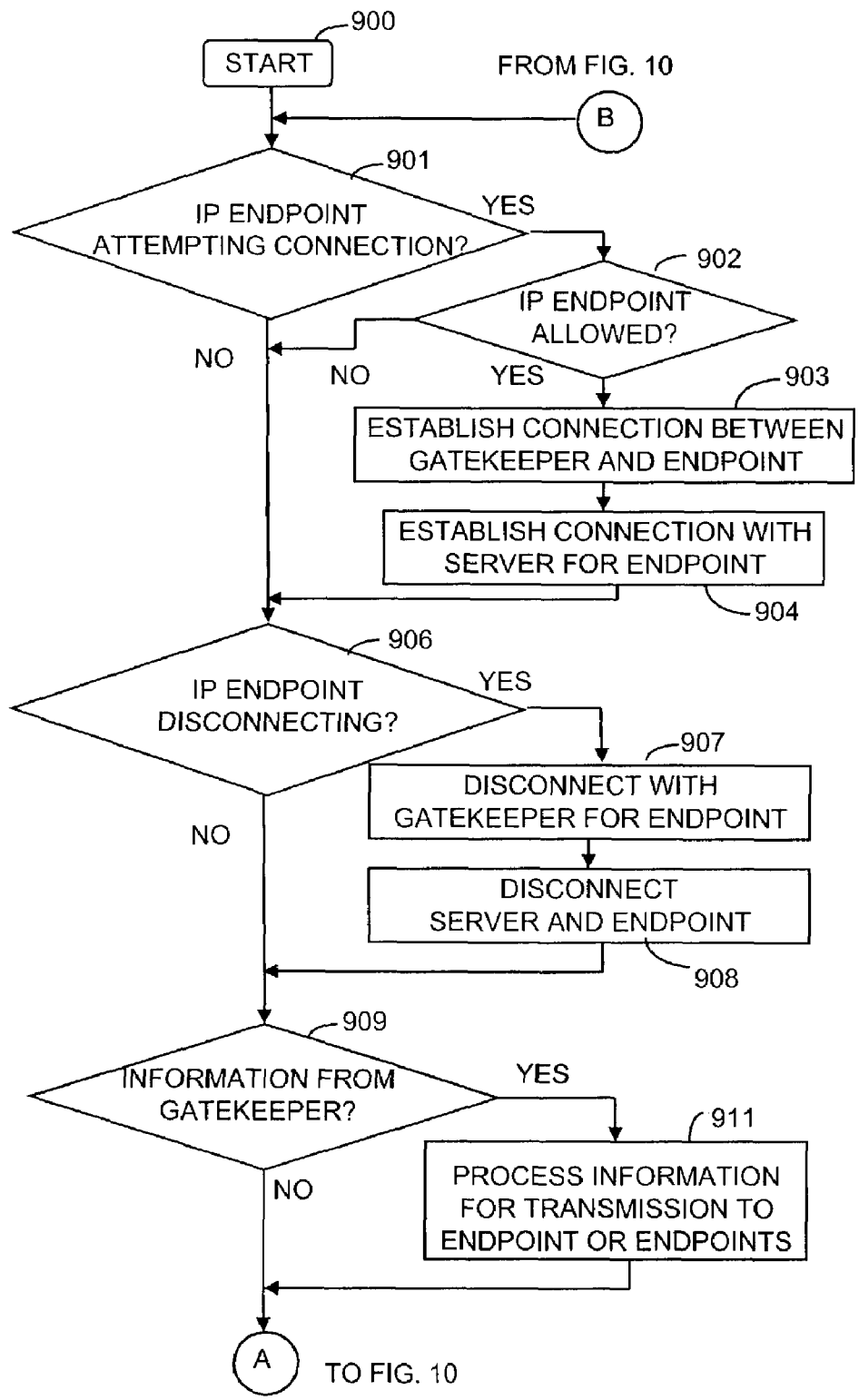

FIGS. 9 and 10 illustrate, in flowchart form, operations performed by server 319 or server 413 of FIGS. 3 and 4 respectively, to provide telephony services for devices 312-314 and 321 of FIG. 3 and devices 407-411 of FIG. 4. A variety of devices could receive telephony service from server 319 or server 413. These devices include IP telephones, wireless telephones, personal digital assistants (PDAs), etc. All which are referred to as IP endpoints. Once started in block 900, decision block 901 determines if an IP endpoint is attempting to establish a connection with the server. If the answer is yes in decision block 901, decision block 902 checks an internal table to determine if this IP endpoint is allowed to receive service from the server. If the answer is no, control is transferred to decision block 906. If the answer in decision block 902 is yes, block 903 establishes a connection with the gatekeeper by server connecting to the gatekeeper as the IP endpoint. The gatekeeper can be the telecommunication switching system 300 of FIG. 3 or gatekeeper 402 of FIG. 4. After the gatekeeper has established the connection with the server as the IP endpoint, block 904 then establishes a connection between the server and the endpoint before transferring control to decision block 906.

Decision block 906 determines if an IP endpoint is disconnecting from the server. If the answer is no, control is transferred to decision block 909. If the answer is yes in decision block 906, control is transferred to block 907 which performs a disconnect with the gatekeeper for the endpoint. After execution of block 907, block 908 disconnects the server and the endpoint before transferring control to decision block 909.

Decision block 909 determines if information is being received from the gatekeeper. If the answer is no, control is transferred to decision block 1001 of FIG. 10. If the answer is yes in decision block 909, block 911 processes the information for transmission to one or more endpoints and also, if necessary, stores statistical or other information concerning this information. After execution of block 911 control is transferred to decision block 1001 of FIG. 10. In one embodiment of block 911, the server may maintain an audio or a text transcript of the conversation that a particular endpoint is engaged in. Also, the server may in another embodiment maintain a call log of calls received or placed by the IP endpoint. In yet another embodiment, the server may perform a bridging operation of audio information by sending the audio information not only to the destination IP endpoint but also to other IP endpoints. Similarly, in yet another embodiment, the server may be aware that the user is not utilizing this particular IP endpoint and may direct an incoming call to yet another IP endpoint such as wireless telephone. Where control is being received by the server for an IP endpoint, the server can perform a number of different operations with this received control information. The server can maintain a log of calls. In addition, in another embodiment the server can transmit the control information in a reformatted form to a personal computer or PDA associated with the IP telephone. Also, in another embodiment the server can convert control information that would normally be displayed as visual information into audio information and insert this information into a call that the user may presently be on or announce the information to the user via a speaker phone in the IP endpoint.

Decision block 1001 determines if there is information available on the server for utilization by one or more endpoints that is not directly related to telephony call information. If the answer is yes, control is transferred to block 1002. In some embodiments, such information could include, but not be limited to, stock information, weather information, various types of alerting messages, information extracted from database 318 by server 319 to perform complex automatic call directory functions, or other such complex telephone features. In addition, another embodiment of the server could be performing a voice or text messaging function, and the server may need to alert an IP endpoint of a voice or text message. In addition, the ability of wireless telephones to transmit short textual messages could be utilized by the server to send textual messages to the user of an IP endpoint while the user is engaged in a voice conversation on that IP endpoint. In addition, in another embodiment, the server may automatically send such other information to other IP endpoints that were associated with the initial destination IP endpoint. After execution of block 1002, control is transferred to decision block 1003.

Decision block 1003 determines if information is being received from an IP endpoint. If the answer is no, control is transferred back to decision block 901 of FIG. 9. If the answer in decision block 1003 is yes, control is transferred to decision block 1004. If the answer in decision block 1004 is yes, control is transferred to block 1006 to process the audio information. In one embodiment of the server, block 1006 may maintain an audio or textual transcript of the audio information being received from the IP endpoint so as to maintain a record of a particular telephone call. In other embodiments, block 1006 may transmit the audio information to not only the gatekeeper, but to other IP endpoints. Further, block 1006 transmits the audio information to the gatekeeper before transferring control to decision block 1007.

Decision block 1007 determines if control information is being received from the IP endpoint. If the answer is no, control is transferred to decision block 901 of FIG. 9. If the answer in decision block 1007 is yes, block 1008 processes the control information before transferring control to decision block 901 of FIG. 9. Block 1008 determines initially if the control information should be transmitted to the gatekeeper or is for the internal use of the server. Various embodiments may utilize the keyboard and buttons on an IP endpoint to control functions provided by the server. In one embodiment, an actuation of a button on an IP endpoint could result in the server accessing a database to provide a variety of information to the IP endpoint. Such information could be stock prices, weather, etc. In another embodiment, the server may transmit the control information received from one IP endpoint to other IP endpoints associated with that particular IP endpoint. Also, in other embodiments, the server is responsive to control information from an IP endpoint to perform complex telephony operations distinct from the gatekeeper.

When the operations of a server or computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The server or computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where server or computer is implemented in hardware, server or computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for providing telephony operations, comprising the steps of:
    registering on a telephony gatekeeper via a network by a computer as a telephony endpoint whereby the computer identifies itself to the telephony gatekeeper as the telephony endpoint;
    registering by the computer the telephony endpoint on the computer in response to a request from the telephony endpoint received via the network; and
    providing telephony operations to the telephony endpoint by the computer in response to information from the telephony gatekeeper.

2. The method of claim 1 further comprises the steps of registering on a telephony gatekeeper via a network by a computer as another telephony endpoint and;
    registering the other telephony endpoint on the computer in response to a request from the other telephony endpoint received via the network.

3. The method of claim 2 wherein the step of providing comprises the step of conferencing the telephony endpoints together.

4. The method of claim 2 wherein the step of providing comprises the steps of controlling the telephony endpoints to appear to function as if a single entity; and
    allowing a user of the telephony endpoints to control operations of the telephony endpoints via an visual interface of the computer.

5. The method of claim 4 wherein the step of controlling comprises the step of presenting the telephony endpoints to a user as sharing line appearances of a single telephone set.

6. The method of claim 1 further comprises the steps of implementing a softphone on the computer; and
    registering on the telephony gatekeeper the softphone by the computer.

7. The method of claim 6 wherein the step of providing comprises the step of conferencing the telephony endpoint and softphone together.

8. The method of claim 6 wherein the step of providing comprises the steps of controlling the telephony endpoint and the softphone to appear to function as if a single entity; and
    allowing a user of the telephony endpoint and softphone to control operations of the telephony endpoint and softphone via an visual interface of the computer.

9. The method of claim 8 wherein the step of controlling comprises the step of presenting the telephony endpoints to a user as sharing line appearances of a single telephone set.

10. The method of claim 2 further comprises the steps of implementing a softphone on the computer; and
    registering on the telephony gatekeeper the softphone by the computer.

11. The method of claim 10 wherein the step of providing comprises the steps of controlling the telephony endpoints and the softphone to appear to function as if a single entity; and
    allowing a user of the telephony endpoints and softphone to control operations of the telephony endpoints and softphone via an visual interface of the computer.

12. The method of claim 1 wherein the step of providing comprises the steps of converting visual call status information to audio call status information; and
    presenting the audio call status information on the telephony endpoint whereby an visually impaired person can use the telephony endpoint.

13. The method of claim 1 further comprises connecting to a server by the computer;
    accessing information from the server by the computer for the telephony endpoint; and
    presenting the accessed information on the telephony endpoint to a user of the telephony endpoint.

14. The method of claim 13 wherein the accessed information is presented as audio information.

15. The method of claim 13 wherein the accessed information is presented as textual information.

16. The method of claim 13 wherein the telephony endpoint is an IP telephone set having buttons for defining operations and the method further comprises the steps of actuating one of the buttons by a user; and the step of accessing responsive to the actuated button to access the accessed information.

17. The method of claim 1 wherein the step of providing comprises the step of redirecting an incoming call for the telephony endpoint to another telephony endpoint.

18. The method of claim 1 wherein the step of providing comprises the step of recording audio information communicated during calls of the telephony endpoint.

19. The method of claim 1 wherein the step of providing comprises the step of recording textual information communicated during calls of the telephony endpoint.

20. A method for providing telephony operations, comprising the steps of:

registering on a telephony gatekeeper via a network by a server as a plurality of telephony endpoints whereby the server identifies itself as each of the plurality of telephony endpoints to the telephony gatekeeper;

registering by the server each of the plurality of telephony endpoints on the server in response to a request from each of the plurality of telephony endpoints received via the network; and providing telephony operations to the plurality of telephony endpoints by the server in response to information from the telephony gatekeeper.

21. The method of claim 20 wherein the step of providing comprises the step of conferencing a set of the plurality of telephony endpoints together.

22. The method of claim 20 where in the step of providing comprises the steps of controlling a set of the plurality of telephony endpoints to appear to function as if a single entity.

23. The method of claim 22 wherein the step of controlling comprises the step of presenting the set of the plurality of telephony endpoints to a user as sharing line appearances of a single telephone set.

24. The method of claim 20 wherein one of the plurality of telephony endpoints is a computer and the method further comprises the steps of implementing a softphone on the computer.

25. The method of claim 24 wherein the step of providing comprises the step of conferencing a set of the plurality of telephony endpoints and softphone together.

26. The method of claim 24 wherein the step of providing comprises the steps of controlling a set of the plurality of telephony endpoints and the softphone to appear to function as if a single entity; and allowing a user of the computer to control operations of the endpoint and softphone via an visual interface of the computer.

27. The method of claim 26 wherein the step of controlling comprises the step of presenting the set of the plurality of telephony endpoints to a user as sharing line appearances of a single telephone set.

28. The method of claim 20 wherein the step of providing comprises the steps of converting visual call status information to audio call status information for one of the plurality of telephony endpoints; and presenting the audio call status information on the one of the plurality of telephony endpoints whereby an visually impaired person can use the one of the plurality of telephony endpoints.

29. The method of claim 20 further comprises connecting to a database by the server;

accessing information from the database by the server for one of the plurality of telephony endpoints; and presenting the accessed information on the one of the plurality of telephony endpoints to a user of the one of the plurality of telephony endpoints.

30. The method of claim 29 wherein the accessed information is presented as audio information.

31. The method of claim 29 wherein the accessed information is presented as textual information.

32. The method of claim 29 wherein the one of the plurality of telephony endpoints is an IP telephone set having buttons for defining operations and the method further comprises the steps of actuating one of the buttons by a user; and the step of accessing responsive to the actuated button to access the accessed information.

33. The method of claim 29 wherein the one of the plurality of telephony endpoints is an IP telephone set having buttons for defining operations and the method further comprises the steps of actuating one of the buttons by a user; and performing telephony operations independent of the telephony gatekeeper for the IP telephone by server in response to the actuated button to access the accessed information.

34. The method of claim 20 wherein the step of providing comprises the step of redirecting an incoming call for one of the plurality of telephony endpoints to another telephony endpoint.

35. The method of claim 20 wherein the step of providing comprises the step of recording audio information communicated during calls of a set of the plurality of telephony endpoints.

36. The method of claim 20 wherein the step of providing comprises the step of recording textual information communicated during calls of the set of the plurality of telephony endpoints.

37. A tangible computer-readable medium comprising computer-executable instructions stored in a computer and executed by the computer configured for:

registering on a telephony gatekeeper via a network by the computer as a telephony endpoint whereby the computer identifies itself to the telephony gatekeeper as the telephony endpoint;

registering the telephony endpoint on the computer in response to a request from the telephony endpoint received via the network; and providing telephony operations to the telephony endpoint by the computer in response to information from the telephony gatekeeper.

38. The computer-readable medium of claim 37 further comprises registering on a telephony gatekeeper via a network by a computer as another telephony endpoint and;

registering the other telephony endpoint on the computer in response to a request from the other telephony endpoint received via the network.

39. The computer-readable medium of claim 38 wherein the providing comprises conferencing the telephony endpoints together.

40. The computer readable medium of claim 38 wherein the providing comprises controlling the telephony endpoints to appear to function as if a single entity; and allowing a user of the telephony endpoints to control operations of the telephony endpoints via an visual interface of the computer.

41. The computer-readable medium of claim 40 wherein the controlling comprises presenting the telephony endpoints to a user as sharing line appearances of a single telephone set.

42. The computer-readable medium of claim 37 further comprises implementing a softphone on the computer; and
registering on the telephony gatekeeper the softphone by the computer.

43. The computer-readable medium of claim 42 wherein the providing comprises conferencing the telephony endpoint and softphone together.

44. The computer-readable medium of claim 42 wherein the providing comprises controlling the telephony endpoint and the softphone to appear to function as if a single entity; and
allowing a user of the telephony endpoint and softphone to control operations of the telephony endpoint and softphone via an visual interface of the computer.

45. The computer-readable medium of claim 44 wherein the controlling comprises presenting the telephony endpoints to a user as sharing line appearances of a single telephone set.

46. The computer-readable medium of claim 38 further comprises implementing a softphone on the computer; and
registering on the telephony gatekeeper the softphone by the computer.

47. The computer-readable medium of claim 46 wherein the providing comprises controlling the telephony endpoints and the softphone to appear to function as if a single entity; and
allowing a user of the telephony endpoints and softphone to control operations of the telephony endpoints and softphone via an visual interface of the computer.

48. The computer-readable medium of claim 37 wherein the providing comprises converting visual call status information to audio call status information; and
presenting the audio call status information on the telephony endpoint whereby an visually impaired person can use the telephony endpoint.

49. The computer-readable medium of claim 37 further comprises connecting to a server by the computer;
accessing information from the server by the computer for the telephony endpoint; and
presenting the accessed information on the telephony endpoint to a user of the telephony endpoint.

50. The computer-readable medium of claim 49 wherein the accessed information is presented as audio information.

51. The computer-readable medium of claim 49 wherein the accessed information is presented as textual information.

52. The computer-readable medium of claim 49 wherein the telephony endpoint is an IP telephone set having buttons for defining operations and the computer-readable medium further comprises actuating one of the buttons by a user; and
the accessing responsive to the actuated button to access the accessed information.

53. The computer-readable medium of claim 37 wherein the providing comprises redirecting an incoming call for the telephony endpoint to another telephony endpoint.

54. The computer-readable medium of claim 37 wherein the providing comprises recording audio information communicated during calls of the telephony endpoint.

55. The computer-readable medium of claim 37 wherein the providing comprises recording textual information communicated during calls of the telephony endpoint.

56. A tangible computer-readable medium, comprising computer-executable instructions stored in a server and executed by the server, configured for:
registering on a telephony gatekeeper via a network by the server as a plurality of telephony endpoints whereby the server identifies itself as each of the plurality of telephony endpoints to the telephony gatekeeper;
registering each of the plurality of telephony endpoints on the server in response to a request from each of the plurality of telephony endpoints received via the network; and
providing telephony operations to the plurality of telephony endpoints by the server in response to information from the telephony gatekeeper.

57. The computer-readable medium of claim 56 wherein the providing comprises conferencing a set of the plurality of telephony endpoints together.

58. The computer-readable medium of claim 56 wherein the providing comprises controlling a set of the plurality of telephony endpoints to appear to function as if a single entity.

59. The computer-readable medium of claim 58 wherein the controlling comprises presenting the set of the plurality of telephony endpoints to a user as sharing line appearances of a single telephone set.

60. The computer-readable medium of claim 56 wherein one of the plurality of telephony endpoints is a computer and the computer-readable medium further comprises implementing a softphone on the computer.

61. The computer-readable medium of claim 60 wherein the providing comprises conferencing a set of the plurality of telephony endpoints and softphone together.

62. The computer-readable medium of claim 60 where in the providing comprises controlling a set of the plurality of telephony endpoints and the softphone to appear to function as if a single entity; and
allowing a user of the computer to control operations of the endpoint and softphone via an visual interface of the computer.

63. The computer-readable medium of claim 62 wherein the controlling comprises presenting the set of the plurality of telephony endpoints to a user as sharing line appearances of a single telephone set.

64. The computer-readable medium of claim 56 wherein the providing comprises converting visual call status information to audio call status information for one of the plurality of telephony endpoints; and
presenting the audio call status information on the one of the plurality of telephony endpoints whereby an visually impaired person can use the one of the plurality of telephony endpoints.

65. The computer readable medium of claim 56 further comprises connecting to a database by the server;
accessing information from the database by the server for one of the plurality of telephony endpoints; and
presenting the accessed information on the one of the plurality of telephony endpoints to a user of the one of the plurality of telephony endpoints.

66. The computer-readable medium of claim 65 wherein the accessed information is presented as audio information.

67. The computer-readable medium of claim 65 wherein the accessed information is presented as textual information.

68. The computer-readable medium of claim 65 wherein the one of the plurality of telephony endpoints is an IP telephone set having buttons for defining operations and the computer-readable medium further comprises actuating one of the buttons by a user; and
the accessing responsive to the actuated button to access the accessed information.

69. The computer-readable medium of claim 65 wherein the one of the plurality of telephony endpoints is an IP telephone set having buttons for defining operations and the computer-readable medium further comprises actuating one of the buttons by a user; and performing telephony operations independent of the telephony gatekeeper for the IP telephone by server in response to the actuated button to access the accessed information.

70. The computer-readable medium of claim 56 wherein the providing comprises redirecting an incoming call for one of the plurality of telephony endpoints to another telephony endpoint.

71. The computer-readable medium of claim 56 wherein the providing comprises recording audio information communicated during calls of a set of the plurality of telephony endpoints.

72. The computer-readable medium of claim 56 wherein the providing comprises recording textual information communicated during calls of the set of the plurality of telephony endpoints.

* * * * *